(12) United States Patent
Aminaka et al.

(10) Patent No.: US 9,084,130 B2
(45) Date of Patent: Jul. 14, 2015

(54) MOBILE COMMUNICATION SYSTEM, BASE STATION, NETWORK DEVICE, AND CONTROL METHOD AND PROGRAM THEREOF

(75) Inventors: Hiroaki Aminaka, Tokyo (JP); Kojiro Hamabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 442 days.

(21) Appl. No.: 13/499,529

(22) PCT Filed: Aug. 25, 2010

(86) PCT No.: PCT/JP2010/005238
§ 371 (c)(1),
(2), (4) Date: Mar. 30, 2012

(87) PCT Pub. No.: WO2011/039935
PCT Pub. Date: Apr. 7, 2011

(65) Prior Publication Data
US 2012/0190392 A1      Jul. 26, 2012

(30) Foreign Application Priority Data

Oct. 1, 2009    (JP) .................................. 2009-229473

(51) Int. Cl.
*H04B 15/00*        (2006.01)
*H04W 88/02*        (2009.01)
(Continued)

(52) U.S. Cl.
CPC ............ *H04W 24/02* (2013.01); *H04W 52/244* (2013.01); *H04L 1/0003* (2013.01); *H04L 5/0037* (2013.01); *H04L 47/263* (2013.01);
(Continued)

(58) Field of Classification Search
None
See application file for complete search history.

(56) References Cited

U.S. PATENT DOCUMENTS

2004/0127259 A1    7/2004   Matsunaga
2008/0188265 A1    8/2008   Carter et al.
2009/0268671 A1*   10/2009  Cave et al. ..................... 370/328

FOREIGN PATENT DOCUMENTS

CN          1311966 A       9/2001
JP          2004-207840 A   7/2004
(Continued)

OTHER PUBLICATIONS

Kwak et al, Home-eNB Based 3GPP LTE Systems 2008.*
(Continued)

*Primary Examiner* — Ping Hsieh
*Assistant Examiner* — James Yang
(74) *Attorney, Agent, or Firm* — Sughrue Mion, PLLC

(57) ABSTRACT

In order to reduce interference to a macro user equipment by easily selecting a home cell serving as the source of interference to the macro user equipment and adjusting a transmission power or the like, a plurality of base stations (10_1 to 10_3) that constitute a mobile communication system (1) respectively form cells (11_1 to 11_3) for radio communication. A network device (50) causes candidates for a first base station that should perform reconfiguration of the cell among the base stations (10_1 to 10_3) to execute the reconfiguration. The candidates for the first base station are selected based on radio resources used by each of the base stations (10_1 to 10_3) at the time of forming the cells (11_1 to 11_3). Alternatively, the first base station is selected based on uplink interference to each of the base stations (10_1 to 10_3).

10 Claims, 15 Drawing Sheets

(51) Int. Cl.
  *H04W 88/08* (2009.01)
  *H04W 52/04* (2009.01)
  *H04W 24/02* (2009.01)
  *H04L 12/825* (2013.01)
  *H04L 1/00* (2006.01)
  *H04W 52/24* (2009.01)
  *H04L 5/00* (2006.01)
  *H04W 16/14* (2009.01)
  *H04W 28/04* (2009.01)
  *H04W 52/14* (2009.01)
  *H04W 72/00* (2009.01)
  *H04W 84/04* (2009.01)

(52) U.S. Cl.
  CPC ............ *H04W 16/14* (2013.01); *H04W 28/048* (2013.01); *H04W 52/146* (2013.01); *H04W 52/243* (2013.01); *H04W 72/00* (2013.01); *H04W 84/045* (2013.01); *H04W 88/08* (2013.01)

(56) References Cited

FOREIGN PATENT DOCUMENTS

JP   2008-277973 A   11/2008
WO   2008/093100 A2   8/2008

OTHER PUBLICATIONS

Communication dated Jan. 6, 2014, issued by the State Intellectual Property Office of the People's Republic of China in corresponding Application No. 201080044161.0.

"Study on Enhanced Interference Management Mechanisms for HNB", NTT DOCOMO, AT&T, Orange, Qualcomm Europe, NEC, Mitsubishi, Airvana, Fujitsu, 3GPP TSG-RAN3#65, Aug. 2009, 6 pages, R3-091894.

"3rd Generation Partnership Project; Technical Specification Group Radio Access Networks; 3G Home NodeB Study Item Technical Report", 3GPP TR 25.820, V8.2.0, 2008-2009, Release 8.

Communication dated Nov. 4, 2014, issued by the Japanese Patent Office in counterpart Japanese application No. 2011-534042.

* cited by examiner

MOBILE COMMUNICATION SYSTEM, BASE STATION, NETWORK DEVICE, AND CONTROL METHOD AND PROGRAM THEREOF

CROSS REFERENCE TO RELATED APPLICATIONS

This application is a National Stage of International Application No. PCT/JP2010/005238 filed Aug. 25, 2010, claiming priority based on Japanese Patent Application No. 2009-229473, filed Oct. 1, 2009, the contents of all of which are incorporated herein by reference in their entirety.

TECHNICAL FIELD

The present invention relates to a mobile communication system, a base station, a network device, and control method and program thereof and, particularly, to a technique to reduce downlink interference to a user equipment.

BACKGROUND ART

The standardization of a small base station that can be installed in user's home, office and the like is currently under way. The small base station is installed in home, small office and the like by a user, and connected to a mobile communication network via a communication line such as ADSL (Asymmetric Digital Subscriber Line) or FHHT (Fiber To The Home). Such a small base station is generally called a femto base station, a femtocell base station, or a home base station. Further, the coverage area of a cell formed by the small base station is significantly smaller than that of a macro cell used hitherto. Therefore, a cell formed by the small base station is called a femtocell, a home cell or the like.

The 3GPP (3rd Generation Partnership Project) Release 8 standardizes such a small base station as Home Node B (HNB) (see Non Patent Literature 1). A cell formed by HNB (which is referred to hereinafter as HNB cell) is called CSG (Closed Subscriber Group) cell in some cases. Only a pre-registered user equipment (for example, a user equipment used by an owner of HNB or its family) can be basically connected to the CSG cell, and another user equipment cannot be connected thereto.

Thus, a macro user equipment (MUE) that belongs to a macro cell receives downlink interference in the vicinity of the HNB cell (CSG cell) to which it cannot be connected. A problem thus occurs that the interference causes degradation of the downlink communication quality in the MUE.

A technique to address the above problem is disclosed in Non Patent Literature 2. Specifically, the MUE transmits "Measurement Report", which is one of RRC (Radio Resource Control) messages, to RNC (Radio Network Controller) upon receiving downlink interference. The RNC instructs the HNB cell that serves as the source of interference to adjust a transmission power.

It is noted that, in the following explanation, the small base station as described above is generically referred to as "home base station", and a cell formed by the home base station is referred to as "home cell" in some cases. Further, a base station that forms a macro cell is referred to as "macro base station" in some cases for differentiation from "home base station". Furthermore, a user equipment that can be connected to "home cell" is referred to as "home user equipment" in some cases for differentiation from "macro user equipment".

CITATION LIST

Non Patent Literature

NPL 1: 3GPP TR 25.820 v8.2.0 (2008-09), "3G Home Node B (HNB) study item Technical Report"
NPL 2: R3-091894, "Study on Enhanced Interference Management Mechanisms for HNB", [online], 3GPP, [retrieved on Sep. 19, 2009], Internet

SUMMARY OF INVENTION

Technical Problem

However, the above-described Non Patent Literature 2 contains no disclosure about a method of identifying the home cell serving as the source of interference. It is not easy for the RNC to select the home cell as the source of interference from among a large number of home cells formed in the macro cell. Note that, in the case of identifying the home cell as the source of interference in the MUE, a complicated framework is required such as having the RNC indicate a gap pattern for home cell measurement using "Compressed Mode" in order to measure the radio quality related to a frequency other than the frequency under communication and too much time is required to identify the home cell, which is not a good way.

Accordingly, an exemplary object of the present invention is to provide a mobile communication system, a base station, a network device, and control method and program thereof capable of reducing interference to a macro user equipment by easily selecting a home cell serving as the source of interference to the macro user equipment and adjusting a transmission power or the like.

Solution to Problem

In order to achieve the above object, a mobile communication system according to a first exemplary aspect of the present invention includes a first base station, one or a plurality of second base stations, and a network device that transmits a request for updating configuration to at least one of the one or plurality of second base stations based on information about radio resources used by the first base station and each of the one or plurality of second base stations.

Further, a mobile communication system according to a second exemplary aspect of the present invention includes one or a plurality of base stations, and a network device that transmits a request for updating configuration to at least one of the one or plurality of base stations. A base station that has received the request for update determines whether or not to update configuration of the base station based on uplink interference to the base station.

Further, a network device according to a third exemplary aspect of the present invention includes a selecting means for selecting, base stations based on information about radio resources used by a first base station and each of one or a plurality of second base stations, at least one base station to update configuration from among the one or plurality of second, and a transmitting means for transmitting a request for updating the configuration to the selected base station.

Further, a base station according to a fourth exemplary aspect of the present invention includes a determination means for determining whether or not to update configuration of the base station based on radio resources used by the base station when a request for updating the configuration is received from a network device that can communicate with the base station.

Further, a base station according to a fifth exemplary aspect of the present invention includes a determination means for determining whether or not to update configuration of the base station based on uplink interference to the base station when a request for updating the configuration is received from a network device that can communicate with the base station.

Further, a control method according to a sixth exemplary aspect of the present invention provides a method of controlling a network device that can communicate with a first base station and one or a plurality of second base stations. This control method includes selecting at least one base station to update configuration from among the one or plurality of second base stations based on information about radio resources used by each of the base stations, and transmitting a request for updating the configuration to the selected base station.

Further, a control method according to a seventh exemplary aspect of the present invention provides a method of controlling a base station that can communicate with a network device. This control method includes determining whether or not to update configuration of the base station based on radio resources used by the base station when a request for updating the configuration is received from the network device.

Further, a control method according to an eighth exemplary aspect of the present invention provides a method of controlling a base station that can communicate with a network device. This control method includes determining whether or not to update configuration of the base station based on uplink interference to the base station when a request for updating the configuration is received from the network device.

Further, a control program according to a ninth exemplary aspect of the present invention causes a network device that can communicate with a first base station and one or a plurality of second base stations to execute a process to select at least one base station to update configuration from among the one or plurality of second base stations based on information about radio resources used by each of the base stations, and a process to transmit a request for updating the configuration to the selected base station.

Further, a control program according to a tenth exemplary aspect of the present invention causes a base station that can communicate with a network device to execute a process to determine whether or not to update configuration of the base station based on radio resources used by the base station when a request for updating the configuration is received from the network device.

Furthermore, a control program according to an eleventh exemplary aspect of the present invention causes a base station that can communicate with a network device to execute a process to determine whether or not to update configuration of the base station based on uplink interference to the base station when a request for updating the configuration is received from the network device.

Advantageous Effects of Invention

According to the present invention, it is possible to easily select a home cell serving as the source of interference to a macro user equipment and perform reconfiguration, such as adjustment of a transmission power, of the selected home cell to thereby reduce interference to the macro user equipment.

DESCRIPTION OF EMBODIMENTS

Figure 1:
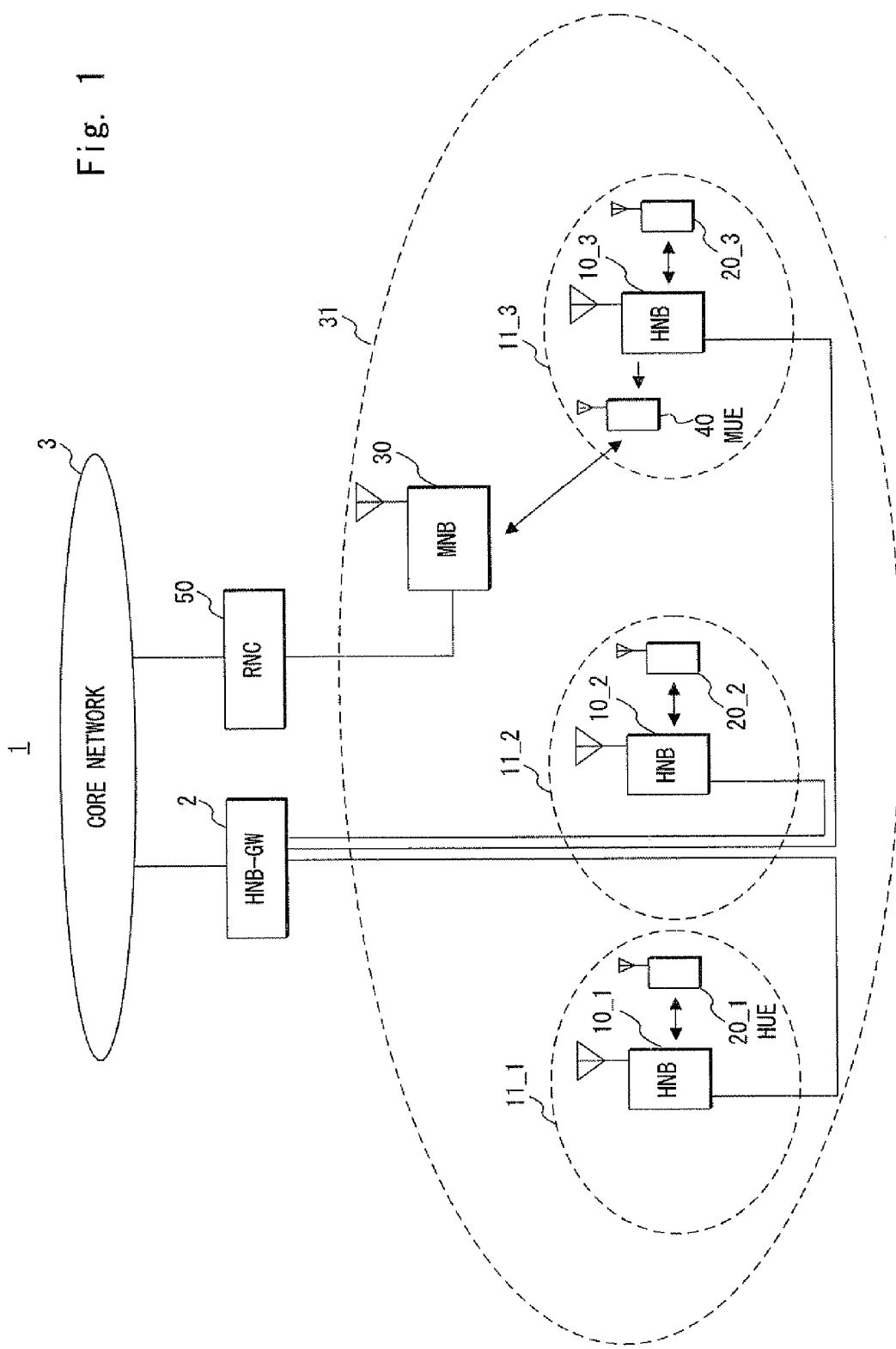
FIG. 1 is a block diagram showing an example of a structure of a mobile communication system common to first to third exemplary embodiments of the present invention.

First to sixth exemplary embodiments of the mobile communication system according to the present invention will be described hereinafter with reference to FIGS. 1 to 15. In the drawings, the identical reference symbols denote identical elements and the redundant explanation thereof will be omitted as appropriate to clarify the explanation.

First Exemplary Embodiment

FIG. 1 shows an example of a schematic structure of a mobile communication system 1 according to this exemplary embodiment. Note that, in this exemplary embodiment and the second and third exemplary embodiments described later, a case where communication compliant with W-CDMA (Wideband Code Division Multiple Access) is conducted is described as an example.

Three home base stations (HNB) 10_1 to 10_3, for example, that constitute the mobile communication system 1 form home cells 11_1 to 11_3, respectively, and thereby conduct radio communication with pre-registered home user equipments (HUE: Home UE) 20_1 to 20_3. Note that, in the following explanation, the HNBs 10_1 to 10_3 are collectively denoted by the symbol 10, the HUEs 20_1 to 20_3 are collectively denoted by the symbol 20, and the home cells 11_1 to 11_3 are collectively denoted by the symbol 11 in some cases. Further, the number of HUEs connected to each home cell may be more than one.

The HNB 10 is connected to a core network 3 operated by a telecommunications carrier through a home base station gateway (HNB-GW) 2, and relays traffic between the HUE 20 and the core network 3. The HNB 10 is connected to the HNB-GW 2 via IP (Internet Protocol) network, Internet or the like using a communication line such as ADSL or FHHT, for example.

Further, a macro base station (MNB: Macro NB) 30 forms a macro cell 31 and thereby conducts radio communication with a macro user equipment (MUE) 40. In the example of FIG. 1, the macro cell 31 is formed so as to include the coverage areas of the home cells 11_1 to 11_3. The MNB 30 is connected to the core network 3 through a radio network controller (RNC) 50, and relays traffic between the MUE 40 and the core network 3. Note that the number of MUEs connected to the macro cell may be more than one. In this case, it is assumed that the MUE 40 is not registered on the HNB 10.

In the operation, when the MUE 40 is located within the home cell 11_3 as shown in FIG. 1, downlink interference to the MUE 40 occurs. At this time, the MUE 40 notifies information about radio resources that serve as the cause of the occurrence of downlink interference (which is referred to hereinafter as interference radio resource information in some cases) to the RNC 50 through the MNB 30. The interference radio resource information is not information for uniquely identifying a home cell but information for narrowing down candidates for a home cell serving as the source of interference among a large number of home cells (information related to a frequency, a scrambling code and the like, described later).

The RNC 50 selects the HNB that is using the radio resources corresponding to the notified information as a candidate for the HNB causing downlink interference to the MUE 40. It is assumed that the RNC 50 stores information about radio resources that are used by the HNB 10_1 to 10_3 at the time of forming the home cells 11_1 to 11_3 in advance. Then, the RNC 50 causes the selected candidate for the HNB to perform reconfiguration of the home cell. Specifically, the RNC 50 requests the reconfiguration of the home cell to the selected candidate for the HNB through the HNB-GW 2. Alternatively, the RNC 50 may request the reconfiguration of the home cell by radio communication through the MNB 30.

As described above, in this exemplary embodiment, the home cell serving as the source of interference to the MUE can be easily selected, and thereby degradation of the downlink communication quality in the MUE can be reduced. Note that the selection of a candidate for the HNB is not necessarily performed in the RNC 50 and may be performed in the HNB-GW 2, a management server (not shown) in the core network 3 or the like. In this case, the RNC 50 may transfer the interference radio resource information notified from the MUE 40 to the HNB-GW 2, the management server or the like.

Hereinafter, specific structure examples and operation examples of the HNB 10, the MUE 40 and the RNC 50 according to this exemplary embodiment are described in detail with reference to FIGS. 2 to 8. It is noted that, because a general MNB that relays traffic between the MUE 40 and the RNC 50 can be used as the MNB 30, explanation of its structure and operation will be omitted.

Figure 2:
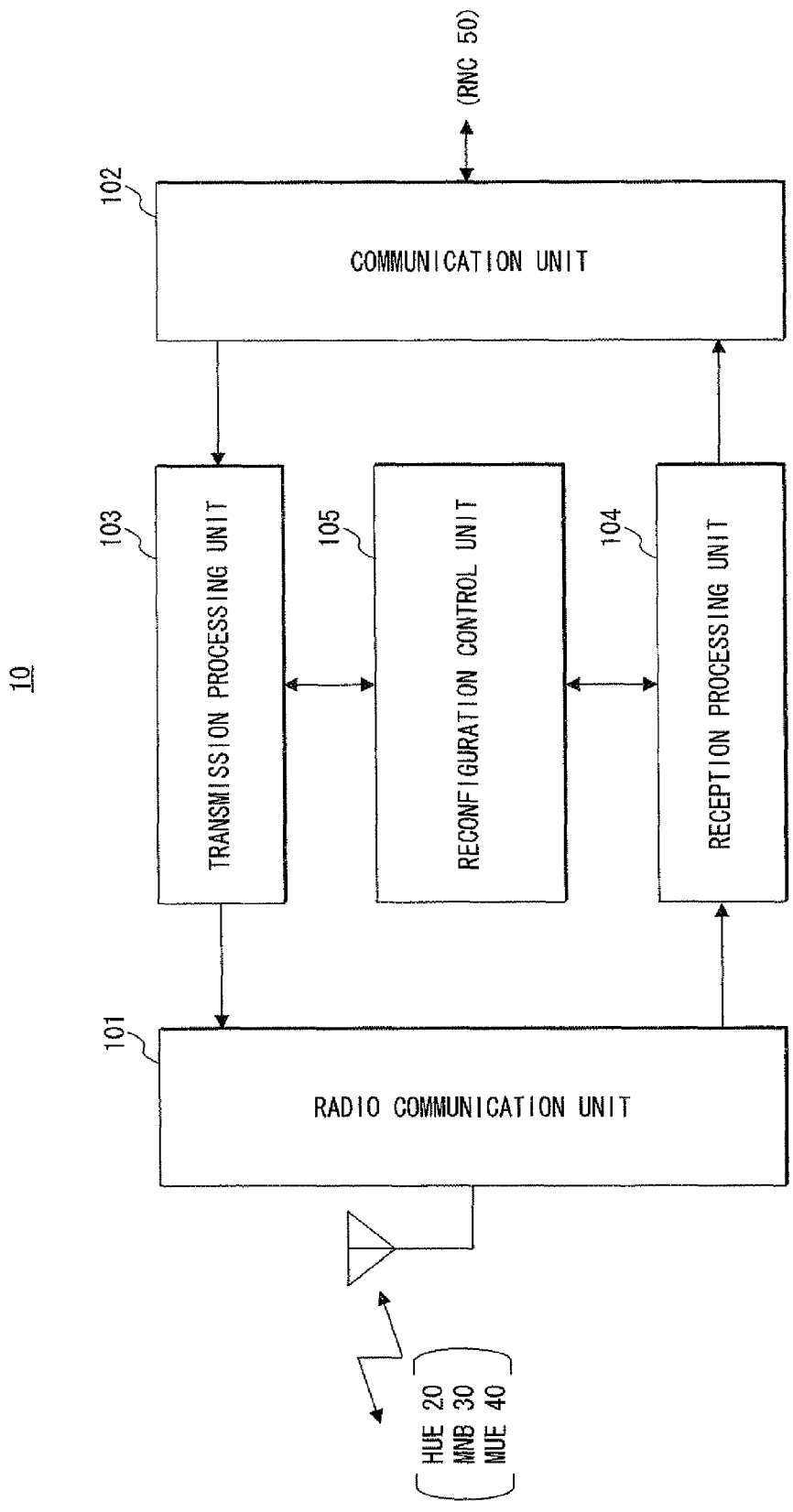
FIG. 2 is a block diagram showing an example of a structure of a home base station according to the first exemplary embodiment of the present invention.

First, as shown in FIG. 2, the HNB 10 includes a radio communication unit 101, a communication unit 102, a transmission processing unit 103, a reception processing unit 104, and a reconfiguration control unit 105. Note that explanation of elements that are not related to reconfiguration of the home cell 11 will be omitted.

The radio communication unit 101 forms the home cell 11 using various radio resources. The communication unit 102 communicates with the RNC 50 through the HNB-GW 2 shown in FIG. 1. The transmission processing unit 103 receives a reconfiguration request to the home cell 11 from the RNC 50 through the communication unit 102 and transfers it to the reconfiguration control unit 105. The reception processing unit 104 receives a reconfiguration request through the radio communication unit 101 and transfers it to the reconfiguration control unit 105.

On the other hand, the reconfiguration control unit 105 updates the configuration of the home cell 11 in response to a reconfiguration request. When a specified time has elapsed after that, the reconfiguration control unit 105 instructs the radio communication unit 101 through the transmission processing unit 103 to set the configuration of the home cell 11 back to predetermined configuration or configuration before update.

Figure 3:
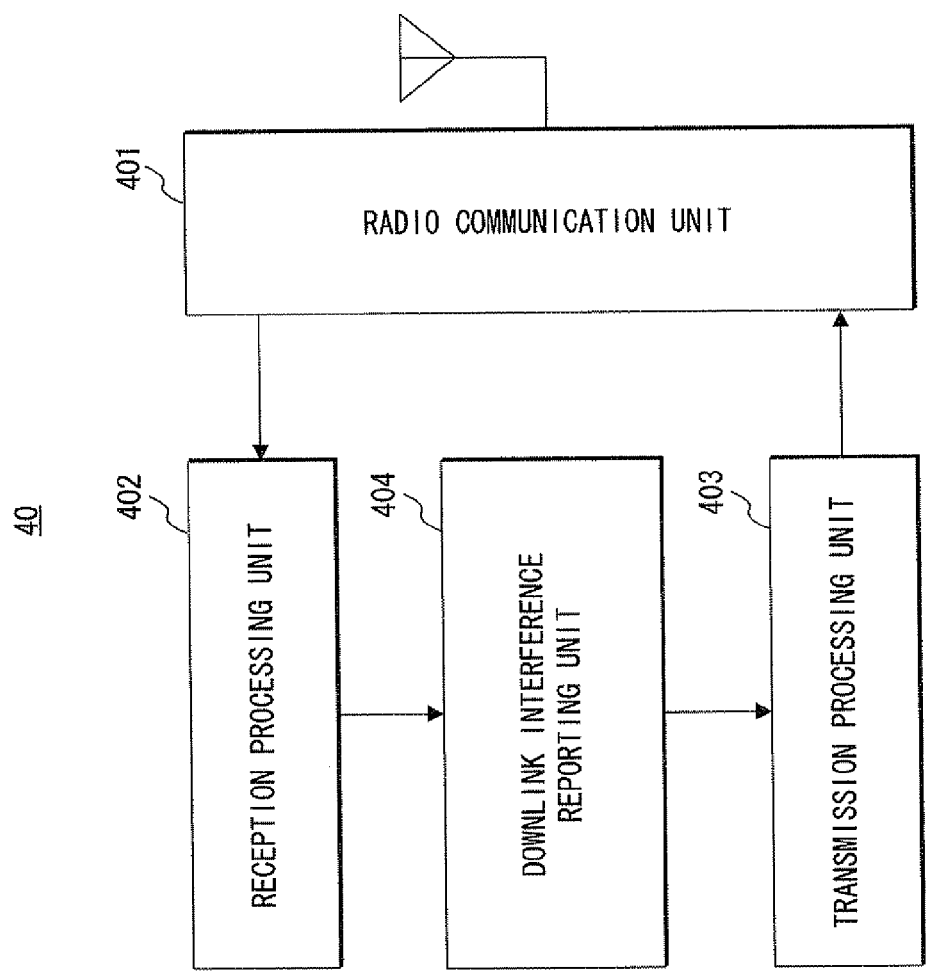
FIG. 3 is a block diagram showing an example of a structure of a macro user equipment according to the first exemplary embodiment of the present invention.

Next, as shown in FIG. 3, the MUE 40 includes a radio communication unit 401, a reception processing unit 402, a transmission processing unit 403, and a downlink interference reporting unit 404. Note that explanation of elements that are not related to reconfiguration of the home cell 11 will be omitted.

When receiving downlink interference from the home cell 11, the reception processing unit 402 notifies that to the downlink interference reporting unit 404 together with interference radio resource information. The downlink interference reporting unit 404 instructs the transmission processing unit 403 to report the interference radio resource information to the RNC 50 through the MNB 30.

Figure 4:
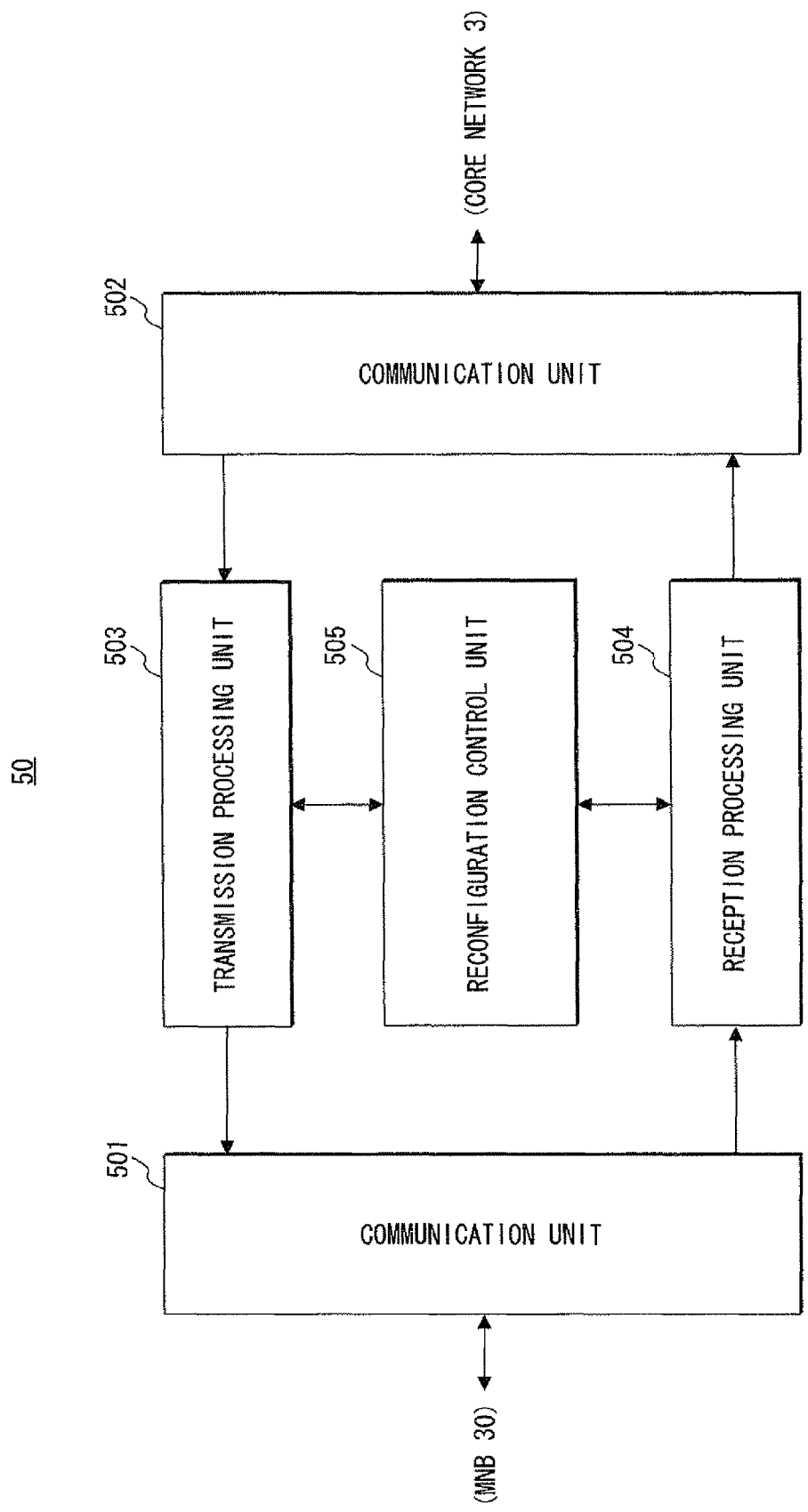
FIG. 4 is a block diagram showing an example of a structure of a network device according to the first exemplary embodiment of the present invention.

Next, as shown in FIG. 4, the RNC 50 includes a communication unit 501 that functions as an interface with the MNB 30, a communication unit 502 that functions as an interface with the core network 3, a transmission processing unit 503, a reception processing unit 504, and a reconfiguration control unit 505. Note that explanation of elements that are not related to reconfiguration of the home cell 11 will be omitted.

The transmission processing unit 503 wirelessly transmits a reconfiguration request generated by the reconfiguration control unit 505 to the HNB 10 via the communication unit 501 and the MNB 30.

The reception processing unit 504 transmits a reconfiguration request generated by the reconfiguration control unit 505 to the HNB 10 via the communication unit 502, the core network 3 and the HNB-GW 2. Further, the reception processing unit 504 transfers the interference radio resource information notified from the MUE 40 to the reconfiguration control unit 505.

The reconfiguration control unit 505 generates a reconfiguration request based on the interference radio resource information and selects a candidate for the HNB to which the reconfiguration request is to be transmitted. Then, the reconfiguration control unit 505 instructs the transmission processing unit 503 or the reception processing unit 504 to transmit the reconfiguration request to the selected candidate for the HNB. The reconfiguration request thereby arrives at the selected candidate for the HNB through a wireless channel or a wired channel. Note that the reconfiguration request may be transmitted through both of the wireless channel and the wired channel.

Hereinafter, an operation example for reconfiguration of the home cell 11 by cooperation of the HNB 10, the MUE 40 and the RNC 50 is described with reference to FIGS. 5 to 8.

Figure 5:
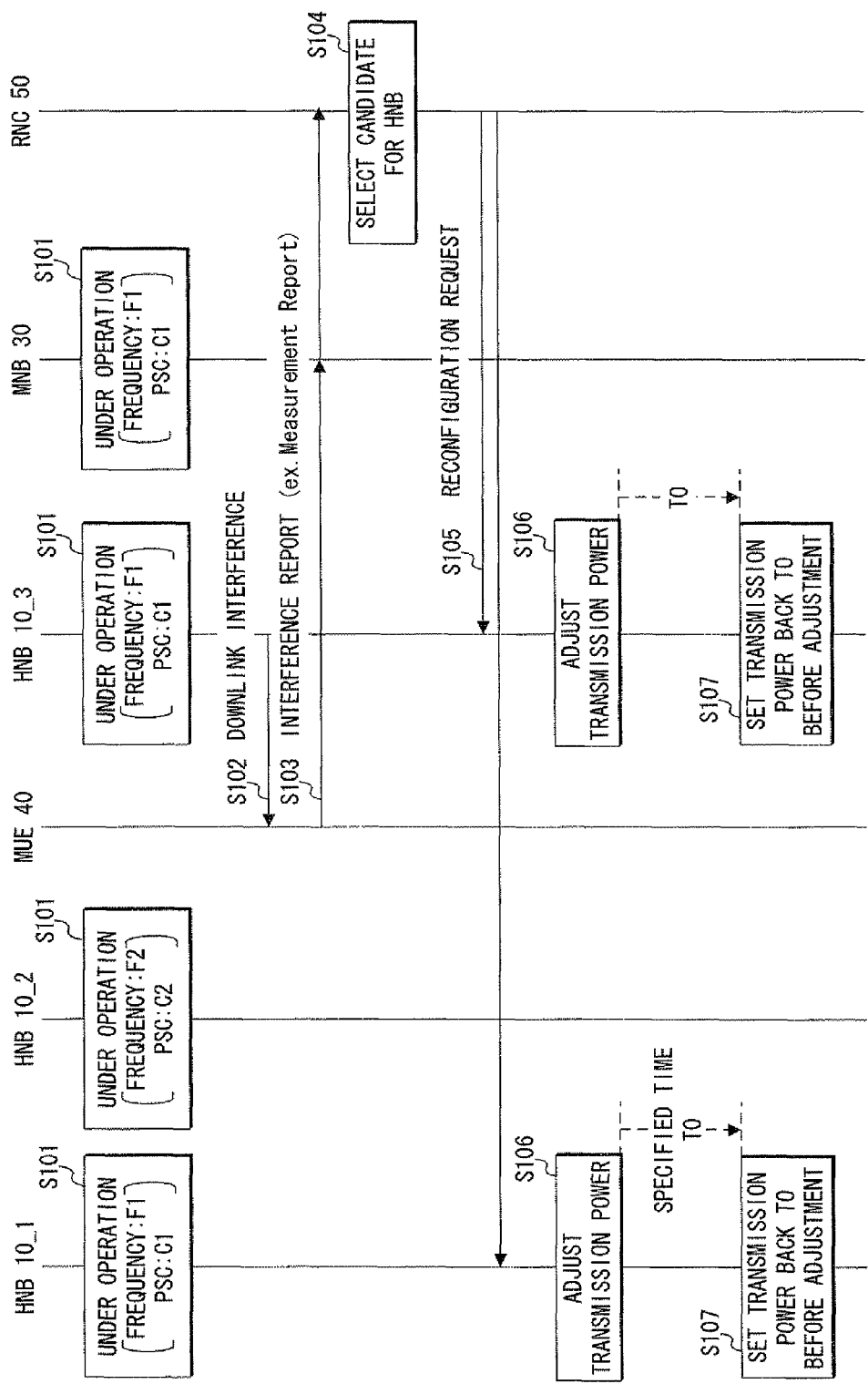
FIG. 5 is a sequence chart showing an example of an overall operation of the mobile communication system according to the first exemplary embodiment of the present invention.

As shown in FIG. 5, it is assumed that the HNBs 10_1 to 10_3 and the MNB 30 shown in FIG. 1 have started into operation. It is also assumed that the radio communication units 101 in the HNBs 10_1 and 10_3 use Frequency="F1" and PSC (Primary Scrambling Code)="C1" in common for the formation of the home cells 11_1 and 11_3, and the radio communication unit 101 in the HNB 10_2 uses Frequency="F2" and PSC="C2" for the formation of the home cell 11_2. On the other hand, it is assumed that the MNB 30 uses Frequency="F1" and PSC="C1" for the formation of the macro cell 31 (Step S101).

Figure 6:
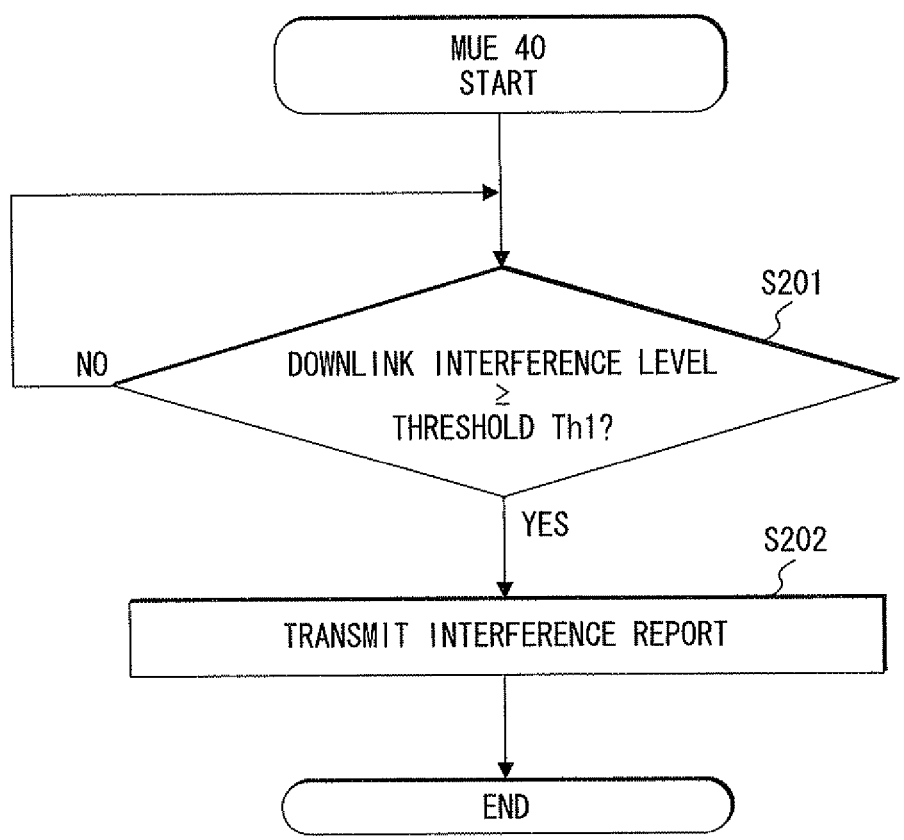
FIG. 6 is a flowchart showing an example of an operation of the macro user equipment according to the first exemplary embodiment of the present invention.

When the MUE 40 is located within the home cell 11_3, downlink interference to the MUE 40 occurs (Step S102). At this time, as shown in FIG. 6, the reception processing unit 402 in the MUE 40 notifies the level of downlink interference to the downlink interference reporting unit 404. The downlink interference reporting unit 404 determines whether or not the downlink interference level is equal to or higher than a threshold Th1 (Step S201).

When, as a result, "downlink interference level≥threshold Th1" is satisfied, the downlink interference reporting unit 404 determines that it is necessary to make an interference report to the RNC 50. Note that, as the threshold Th1, a given value may be used, or a value designated by the RNC 50 may be used.

Then, the downlink interference reporting unit 404 controls the reception processing unit 402 to acquire Frequency="F1" and PSC="C1" that serve as the cause of the occurrence of downlink interference as the interference radio resource information. Further, the downlink interference reporting unit 404 controls the transmission processing unit 403 to transmit the acquired Frequency="F1" and PSC="C1" to the RNC 50 (Steps S103 and S202). Note that Frequency="F1" and PSC="C1" may be transmitted using the above-described "Mesurement Report", for example. At this time, the downlink interference reporting unit 404 may transmit the downlink interference level also.

Figure 7:
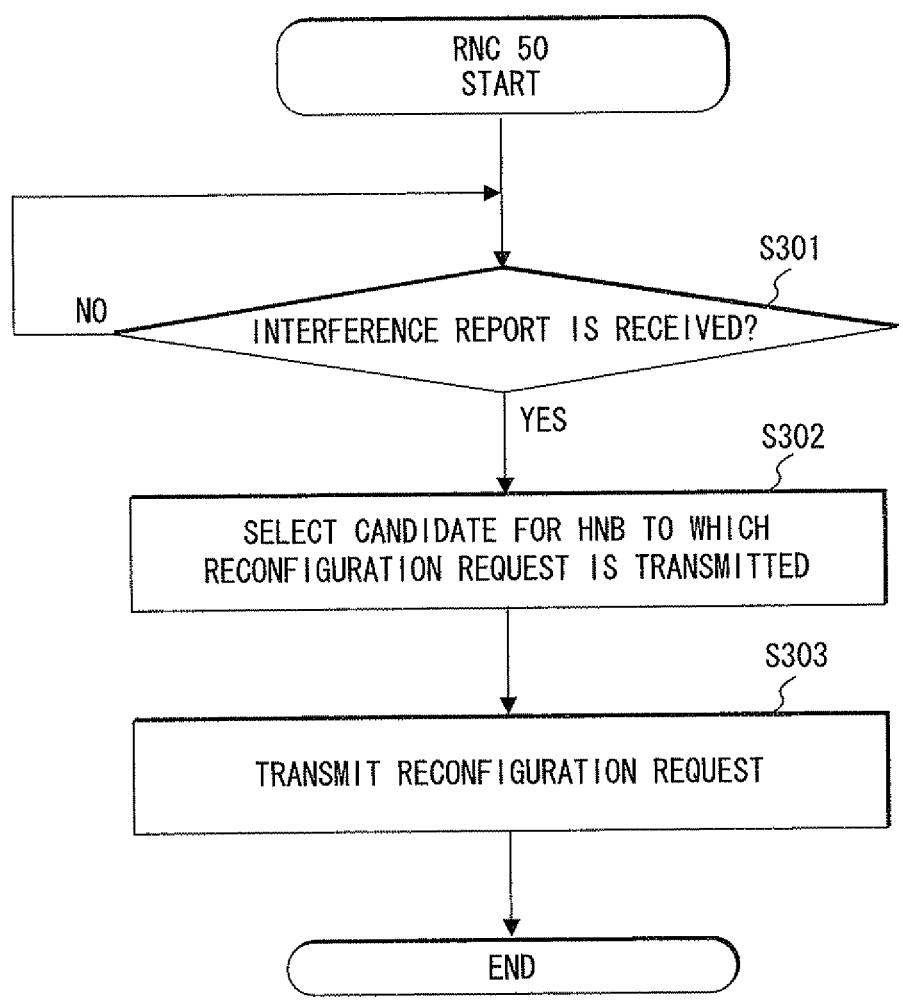
FIG. 7 is a flowchart showing an example of an operation of the network device according to the first exemplary embodiment of the present invention.

As shown in FIG. 7, the reception processing unit 504 in the RNC 50 receives Frequency="F1" and PSC="C1" as an interference report and transfers them to the reconfiguration control unit 505 (Step S301). The reconfiguration control unit 505 selects the HNBs 10_1 and 10_3 that use Frequency="F1" and PSC="C1" as candidates for the HNB to which a reconfiguration request is to be transmitted and excludes the HNB 10_2 from candidates (Steps S104 and S302). Accordingly, no impact is exerted on the communication environment between the HNB 10_2 and the HUE 20_2. Note that the reconfiguration control unit 505 may select the HNB that uses Frequency="F1" or PSC="C1" as candidates. In this case, the processing load on the MUE 40 and the RNC 50 can be reduced.

Then, the reconfiguration control unit 505 controls the transmission processing unit 503 or the reception processing unit 504 to transmit reconfiguration requests to the HNBs 10_1 and 10_3 (Steps S105 and S303).

The reconfiguration request may contain at least one of the instructions (A) to (C) below. Downlink interference to the MUE 40 can be reduced when any of the instructions is contained. Further, when two or more instructions are contained, the effect of reducing downlink interference can be further enhanced.

(A) Instruction to adjust a transmission power
(B) Instruction to change a frequency
(C) Instruction to change a PSC In the case of containing the above instruction (A) into the reconfiguration request, the reconfiguration control unit 505 indicates the amount of adjustment of the transmission power also. The reconfiguration control unit 505 may decide the amount of adjustment according to the downlink interference level notified by the MUE 40. In this case, an advantage that appropriately produces the effect of reducing downlink interference and an advantage that minimizes the impact on the communication environment between the HNB and the HUE can be obtained as well as reducing the load on the MUE and the degradation of the performance of downlink communication.

Figure 8:
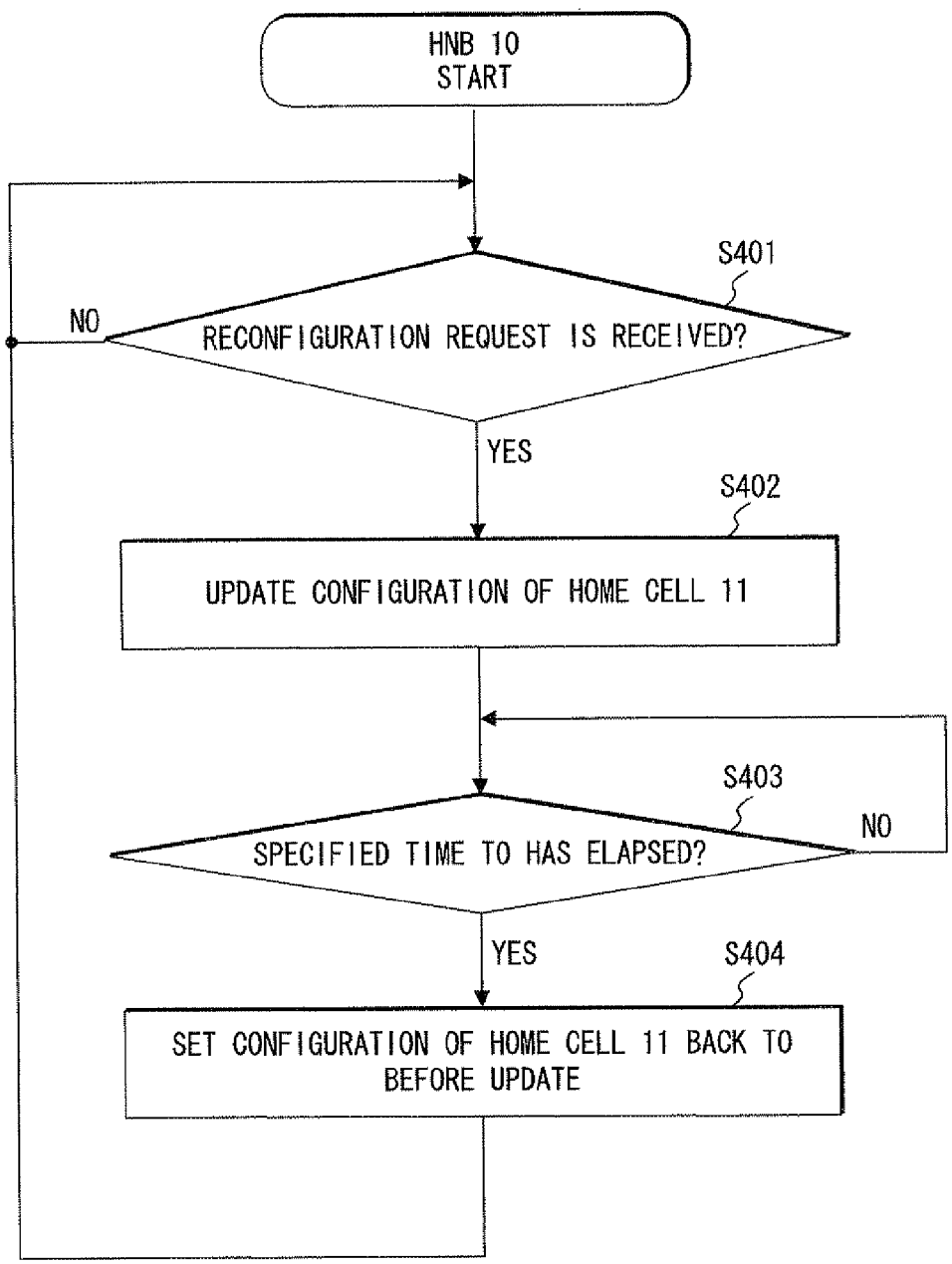
FIG. 8 is a flowchart showing an example of an operation of the home base station according to the first exemplary embodiment of the present invention.

Then, as shown in FIG. 8, the reconfiguration control unit 105 in the HNBs 10_1 and 10_3 receives the reconfiguration request (Step S401) and updates the configuration of the home cells 11_1 and 11_3 according to the instruction contained in the reconfiguration request (Step S402). When a specified time T0 has elapsed after that (Step S403), the reconfiguration control unit 105 controls the radio communication unit 101 through the transmission processing unit 103 to set the configuration of the home cells 11_1 and 11_3 back to the configuration before update (Step S404). The communication environment between the HNB 10_1 and the HUE 20_1 and the communication environment between the HNB 10_3 and the HUE 20_3 are thereby reset to the original environment. Note that the reconfiguration control unit 105 may set the configuration of the home cells 11_1 and 11_3 back to predetermined configuration (for example, default configuration).

Referring back to FIG. 5, taking the case where the RNC 50 instructs the HNBs 10_1 and 10_3 to adjust the transmission power as an example, the HNBs 10_1 and 10_3 respectively reduce the transmission power by the amount of adjustment indicated by the RNC 50 (Step S106). At this time, the HNBs 10_1 and 10_3 may reduce the transmission power in a phased manner.

After that, when a specified time T0 has elapsed, the HNBs 10_1 and 10_3 increase the transmission power back to the transmission power before adjustment or a predetermined transmission power (for example, a transmission power in the initial state) (Step S107). At this time, the HNBs 10_1 and 10_3 may increase the transmission power in a phased manner.

Note that the RNC 50 may uniformly give a reconfiguration request and transfer Frequency="F1" and PSC="C1" as an interference report to the HNBs 10_1 to 10_3, and each of the HNBs 10_1 to 10_3 may determine whether or not its own HNB is the source of interference to the MUE 40 based on Frequency="F1" and PSC="C1". In this case, the RNC 50 can reduce storage resources for storing information about radio resources used by the HNBs 10_1 to 10_3 and also reduce the processing load thereon.

Second Exemplary Embodiment

A mobile communication system according to this exemplary embodiment has the same structure as the mobile communication system 1 described above in the first exemplary embodiment.

Figure 9:
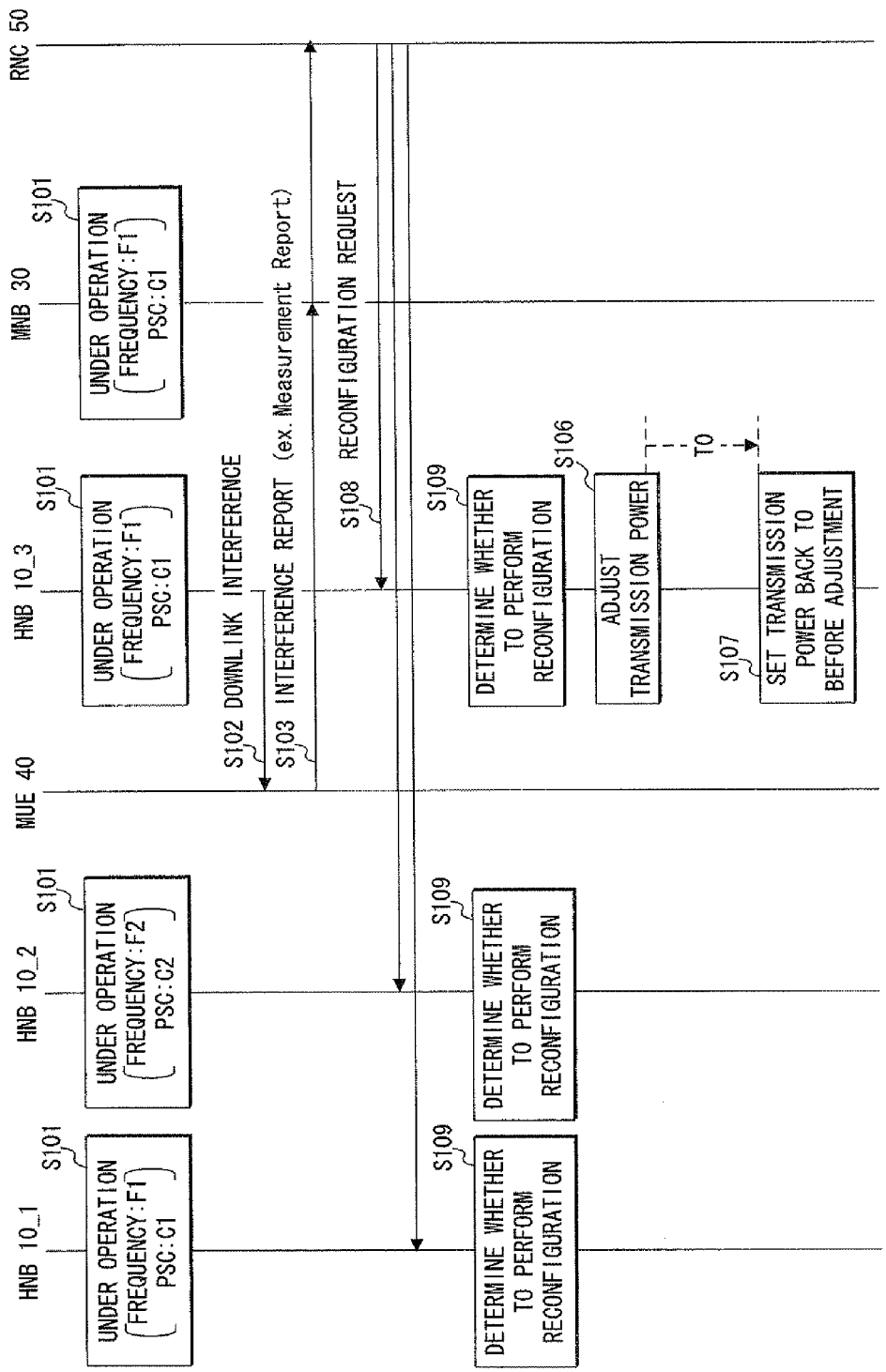
FIG. 9 is a sequence chart showing an example of an overall operation of the mobile communication system according to the second exemplary embodiment of the present invention.

In the operation, as shown in FIG. 9, the RNC 50 executes processing shown at Step S108 in place of Steps S104 and S105 shown in FIG. 5. To be specific, the RNC 50 transmits reconfiguration requests to the HNBs 10_1 to 10_3 installed in the macro cell 31 to which the MUE 40 belongs, without selecting candidates for the HNB to which a reconfiguration request is to be transmitted. Note that the RNC 50 may transmit a reconfiguration request to some of the HNBs installed in the macro cell 31.

Figure 10:
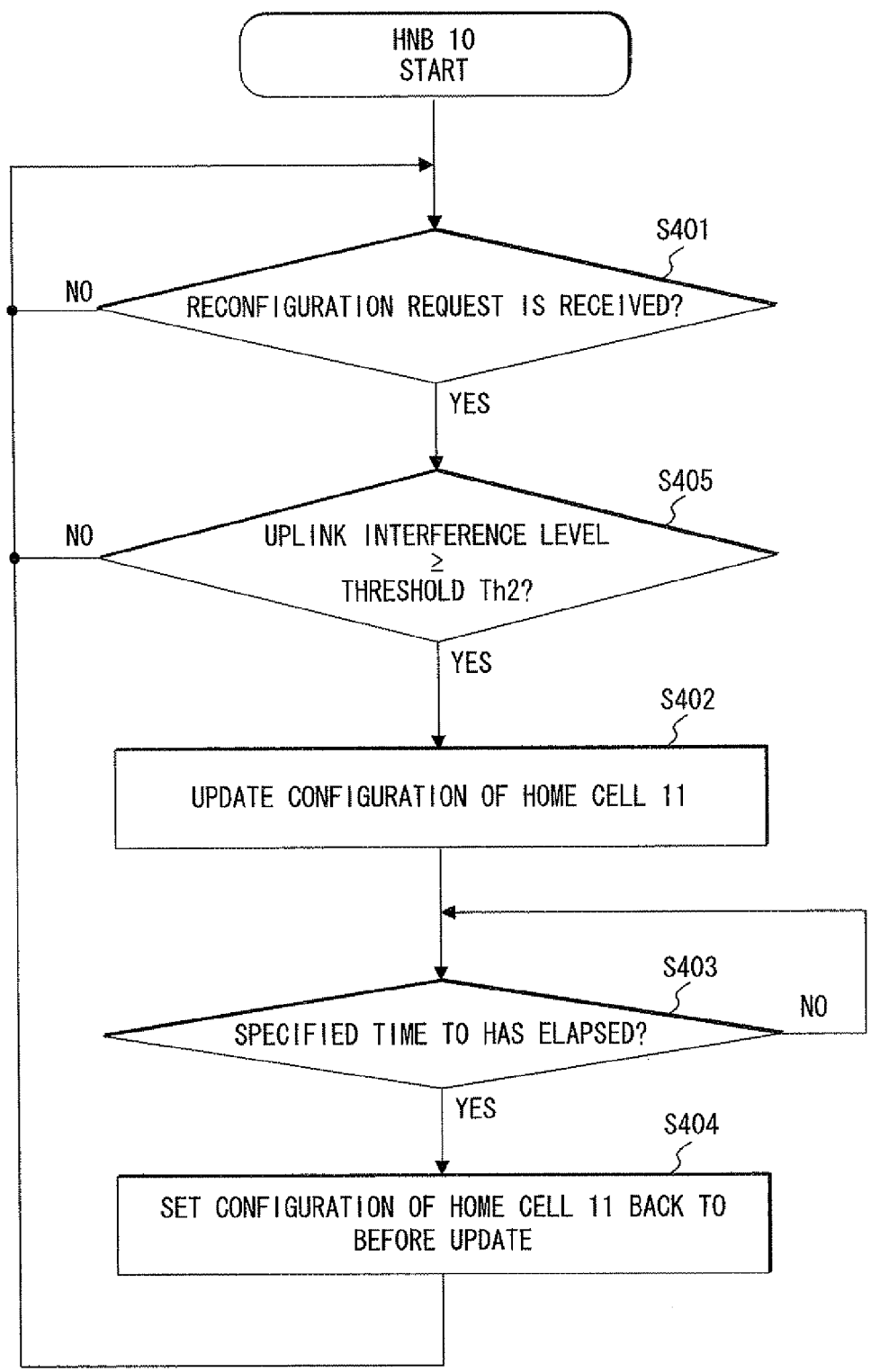
FIG. 10 is a flowchart showing an example of an operation of a home base station according to the second exemplary embodiment of the present invention.

Each of the HNBs 10_1 to 10_3 determines whether or not to perform reconfiguration on each of the home cells 11_1 and 11_3 based on uplink interference to its own HNB (Step S109). To be specific, as shown in FIG. 10, the HNB 10 executes processing shown at Step S405 in addition to Steps S5401 to S404 shown in FIG. 8. Specifically, the reception processing unit 104 in the HNB 10 measures the level of uplink interference from the MUE 40 and notifies it to the reconfiguration control unit 105. When the reconfiguration request is received at the above-described Step S401, the reconfiguration control unit 105 determines whether or not the uplink interference level notified from the reception processing unit 104 is equal to or higher than a threshold Th2.

When, as a result, "uplink interference level≥threshold Th2" is satisfied, the reconfiguration control unit 105 determines that its own HNB 10 is the source of interference to the MUE 40 and proceeds to the above-described Step S402 to update the configuration of the home cell 11. Note that, as the threshold Th2, a value designated by the RNC 50 may be used, or a value decided by the HNB 10 according to a target reception power from the macro cell 31 may be used. As a method of calculating the target reception power, the method disclosed in Japanese Patent Application No. 2008-080744 by the applicant of the present application may be used, for example. The HNB 10 sets the threshold Th2 as a value obtained by adding an offset value notified from the RNC 50 to the target reception power, for example. In this case, the HNB 10 can dynamically change the threshold Th2 according to the installed position of its own HNB in the macro cell 31. For example, the HNB 10 may set the threshold Th2 as a lower value as being closer to the center of the macro cell 31 and as a higher value as being farther from it (as being closer to the edge of the macro cell 31).

On the other hand, when "uplink interference level<threshold Th2" is satisfied at the above-described Step S405, the reconfiguration control unit 105 determines that its own HNB 10 is not the source of interference to the MUE 40 and does not update the configuration of the home cell 11.

Consequently, as shown at Steps S106 and S107 in FIG. 9, only the HNB 10_3, which is the actual source of interference, performs the reconfiguration of the home cell. In this manner, according to this exemplary embodiment, the home cell serving as the source of interference to the MUE can be selected more accurately compared to the first exemplary embodiment described above.

It is noted that the HNB 10 can autonomously adjust the transmission power according to the excess of the uplink interference level above the threshold Th2. For example, the HNB 10 reduces the transmission power as the excess is greater. In this case, the RNC 50 does not need to decide the amount of adjustment of the transmission power as described in the above first exemplary embodiment, thereby allowing simplification of the structure of the RNC 50, reduction of the processing load and the like.

Further, the HNB 10 can autonomously change the frequency through effective utilization of a result of neighboring cell search at the start of operation. To be specific, the HNB 10 measures reception powers from neighboring cells for each of frequencies at the time of forming the home cell 11. Then, the HNB 10 uses a frequency at which the lowest reception power is measured (that is, a frequency at which its own HNB is less likely to become the source of interference). On the other hand, at the time of changing the frequency, the HNB 10 uses a frequency at which the second lowest reception power among the measured reception powers is measured. Alternatively, the HNB 10 may newly measure the reception powers at the time of changing the frequency and use a frequency at which the lowest reception power is measured. When a specified time T0 has elapsed after that, the HNB 10 sets the frequency to be used back to the frequency before change, just like the case of adjusting the transmission power. In the case where the HNB 10 autonomously changes the frequency to be used in this manner, the RNC 50 does not need to decide the frequency to be used by the HNB 10 (that is, which frequency should be used by the HNB 10 in order to reduce downlink interference to the MUE 40). This allows simplification of the structure of the RNC 50, reduction of the processing load and the like.

Third Exemplary Embodiment

A mobile communication system according to this exemplary embodiment has the same structure as the mobile communication system 1 described earlier in the first exemplary embodiment.

Figure 11:
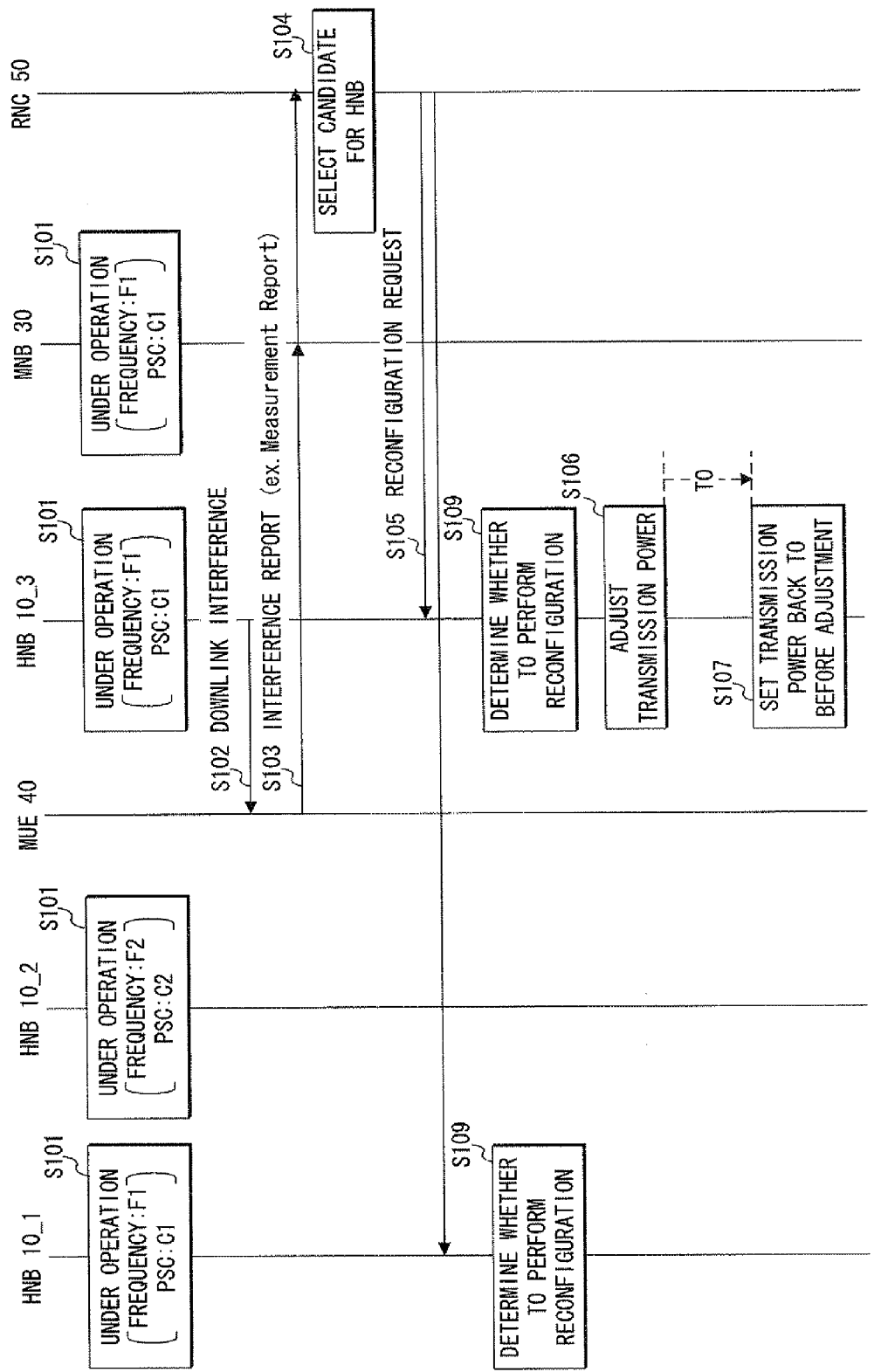
FIG. 11 is a sequence chart showing an example of an overall operation of the mobile communication system according to the third exemplary embodiment of the present invention.

In the operation, as shown in FIG. 11, the RNC 50 selects the HNBs 10_1 and 10_3 as candidates for the HNB to which a reconfiguration request is to be transmitted and transmits reconfiguration requests to the HNBs 10_1 and 10_3 as at Steps S104 and S105 shown in FIG. 5.

Each of the HNBs 10_1 and 10_3 determines whether or not to perform reconfiguration on the home cells 11_1 and 11_3 based on uplink interference to its own HNB as at Step S109 shown in FIG. 9. As a result, only the HNB 10_3, which is the actual source of interference, performs the reconfiguration of the home cell.

As described above, according to this exemplary embodiment, the home cell serving as the source of interference to the MUE can be selected accurately just like the second exemplary embodiment described above. In addition, the HNB other than candidates for the destination of a reconfiguration request does not need to determine whether or not to perform reconfiguration on the home cell. It is thereby possible to reduce the processing load on the HNB compared to the second exemplary embodiment described above and further to suppress the reduction of the communication capacity in the home cell.

Fourth Exemplary Embodiment

Although the mobile communication system compliant with W-CDMA is described in the above first to third exemplary embodiments, the mobile communication system according to the present invention may be applied to another communication method.

Figure 12:
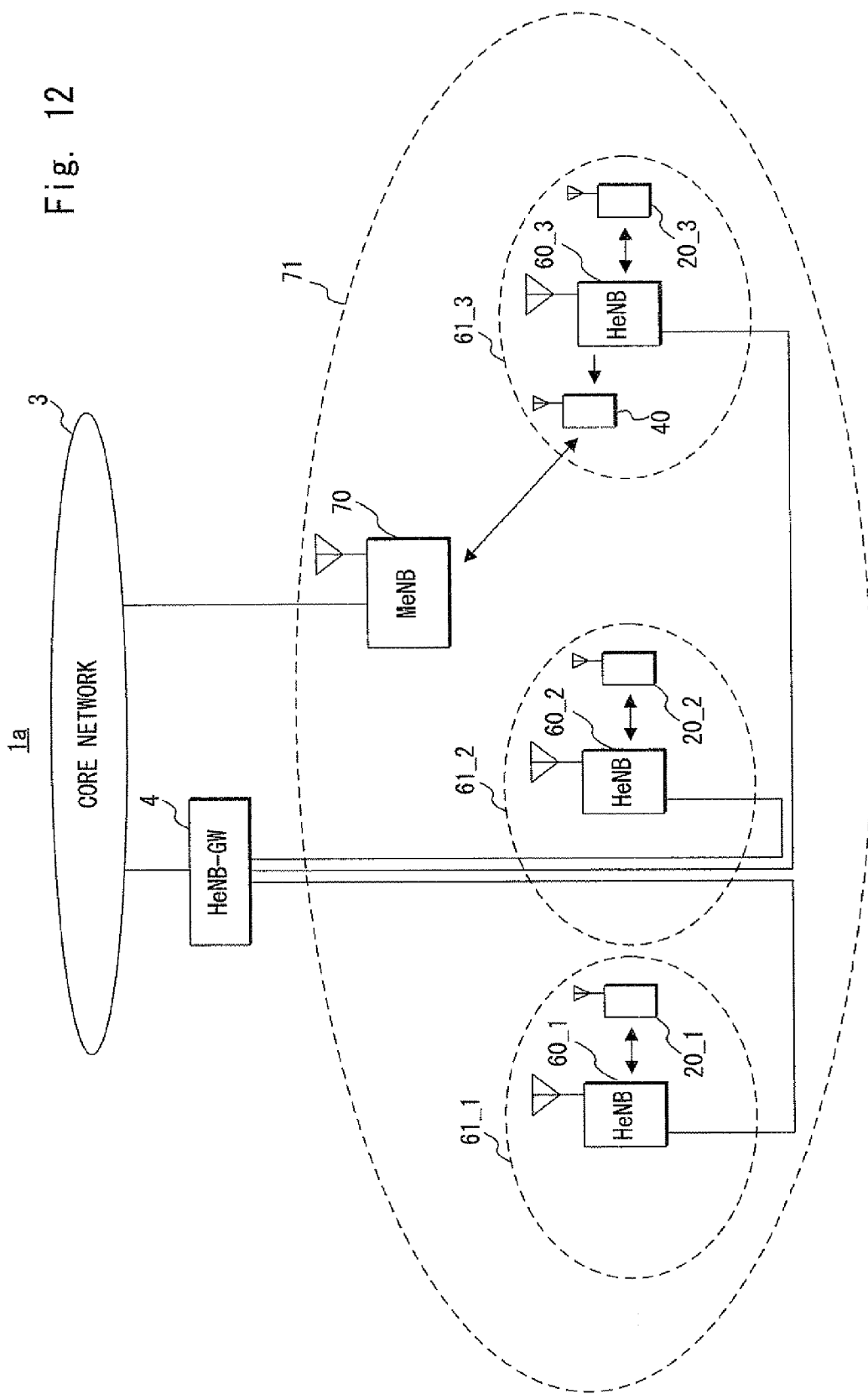
FIG. 12 is a block diagram showing an example of a structure of a mobile communication system common to fourth to sixth exemplary embodiments of the present invention.

FIG. 12 shows a schematic structure example of a mobile communication system 1a according to this exemplary embodiment. The mobile communication system 1a is different from the mobile communication system 1 in that it includes HeNBs (Home evolved Node B) 60_1 to 60_3 compliant with LTE (Long Term Evolution) in place of the HNBs 10_1 to 10_3 shown in FIG. 1 and includes a MeNB (Macro eNB) 70 in place of the MNB 30. Further, the HeNBs 60_1 to 60_3 are connected to the MeNB 70. Note that, in the following explanation, the HeNBs 60_1 to 60_3 are collectively denoted by the symbol 60 in some cases.

The HeNB 60 is one of home base stations, and standardization by 3GPP is under way. The HeNB 60 is connected to the core network 3 through a home base station gateway (HeNB-GW) 4, and relays traffic between the HUE 20 and the core network 3. Further, the MeNB 70 is one of macro base stations and has a function of a control device equivalent to the RNC. The MeNB 70 is connected to the core network 3 and relays traffic between the MUE 40 and the core network 3.

Figure 13:
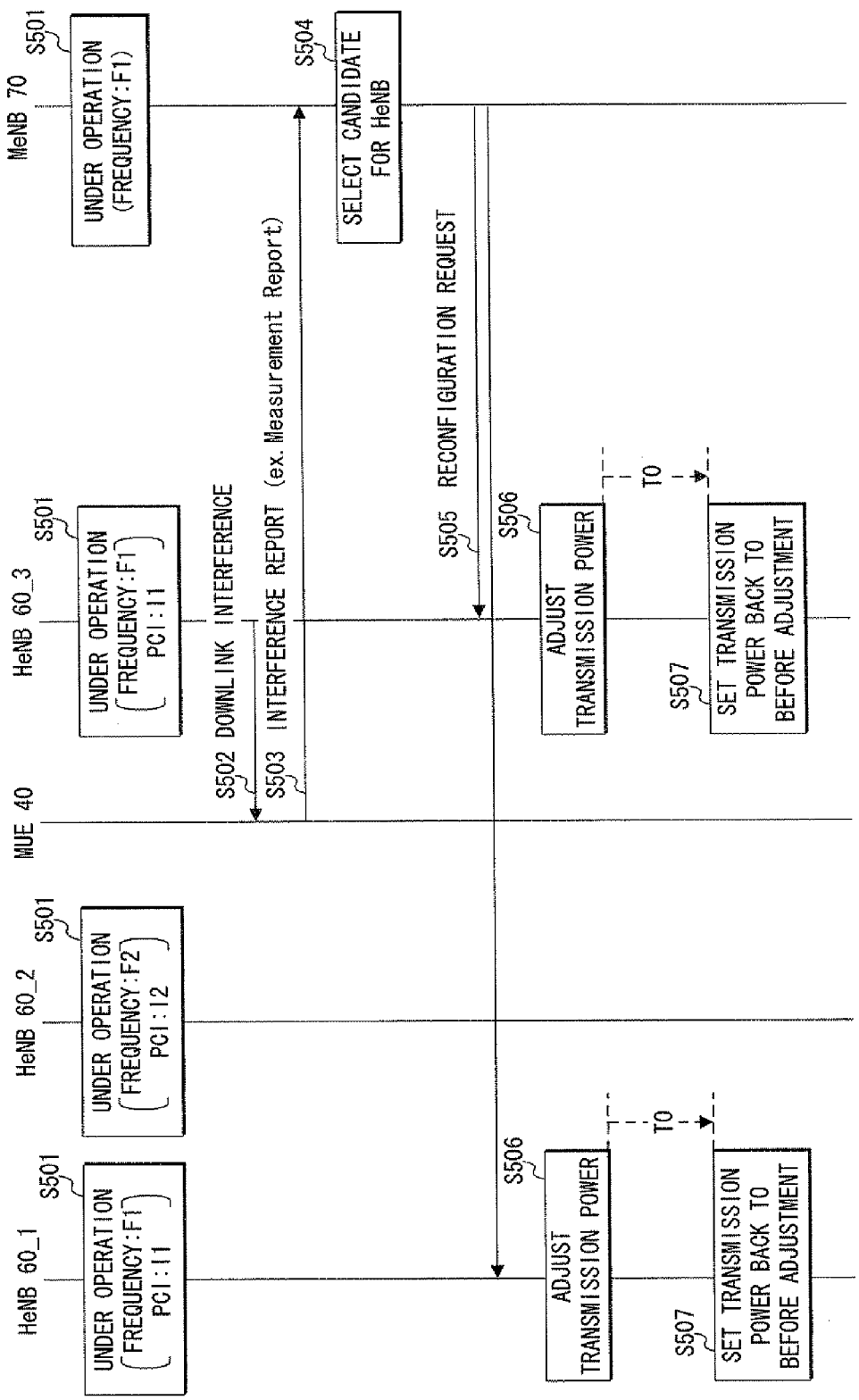
FIG. 13 is a sequence chart showing an example of an overall operation of the mobile communication system according to the fourth exemplary embodiment of the present invention.

In the operation, as shown in FIG. 13, the MeNB 70 and the HeNB 60 respectively execute the same processing as the RNC 50 and the HNB 10 shown in FIG. 5, and the mobile communication system 1a thereby operates in the same manner as in the first exemplary embodiment described earlier. Meanwhile, PCI (Physical Cell ID) is used as a cell identifier instead of the PSC.

In the case of applying the LTE also, the home cell serving as the source of interference to the MUE can be easily selected, and thereby degradation of the downlink communication quality in the MUE can be reduced. Note that the selection of a candidate for the HeNB is not necessarily performed in the MeNB and may be performed in the HeNB-GW, a MME (Mobility Management Entity) or management server included in the core network or the like. Further, in the LTE, a resource block, which is a radio resource region that can be identified by a frequency and time, may be used as the interference radio resource information. The radio resource region may be identified by either a frequency or time.

Fifth Exemplary Embodiment

Figure 14:
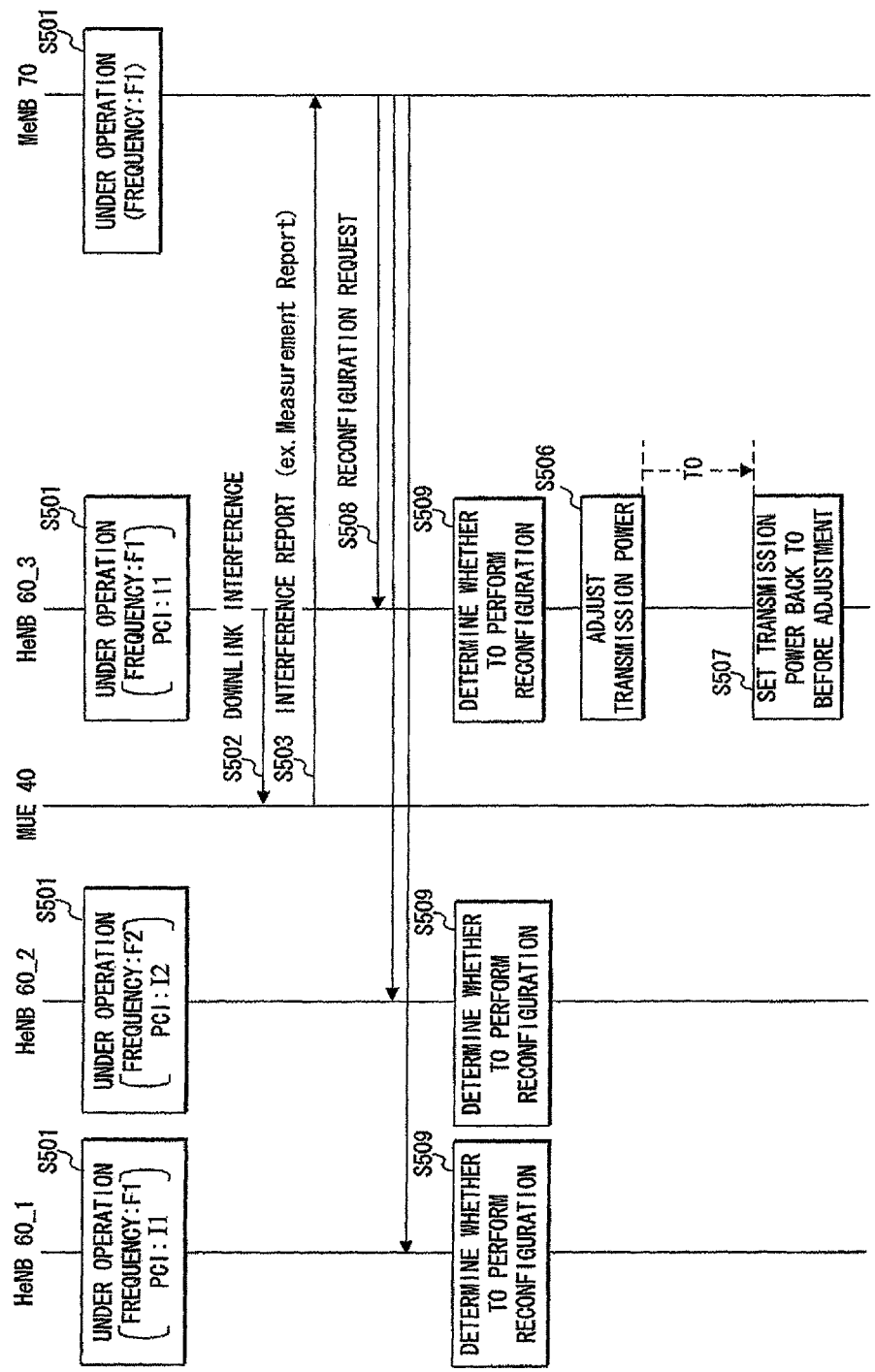
FIG. 14 is a sequence chart showing an example of an overall operation of the mobile communication system according to the fifth exemplary embodiment of the present invention.

A mobile communication system according to this exemplary embodiment has the same structure as the mobile communication system 1a described above in the fourth exemplary embodiment. In the operation, as shown in FIG. 14, the MeNB 70 and the HeNB 60 respectively execute the same processing as the RNC 50 and the HNB 10 shown in FIG. 9, and the mobile communication system 1a thereby operates in the same manner as in the second exemplary embodiment described earlier.

In this manner, according to this exemplary embodiment, the home cell serving as the source of interference to the MUE can be selected more accurately compared to the fourth exemplary embodiment described above.

Sixth Exemplary Embodiment

Figure 15:
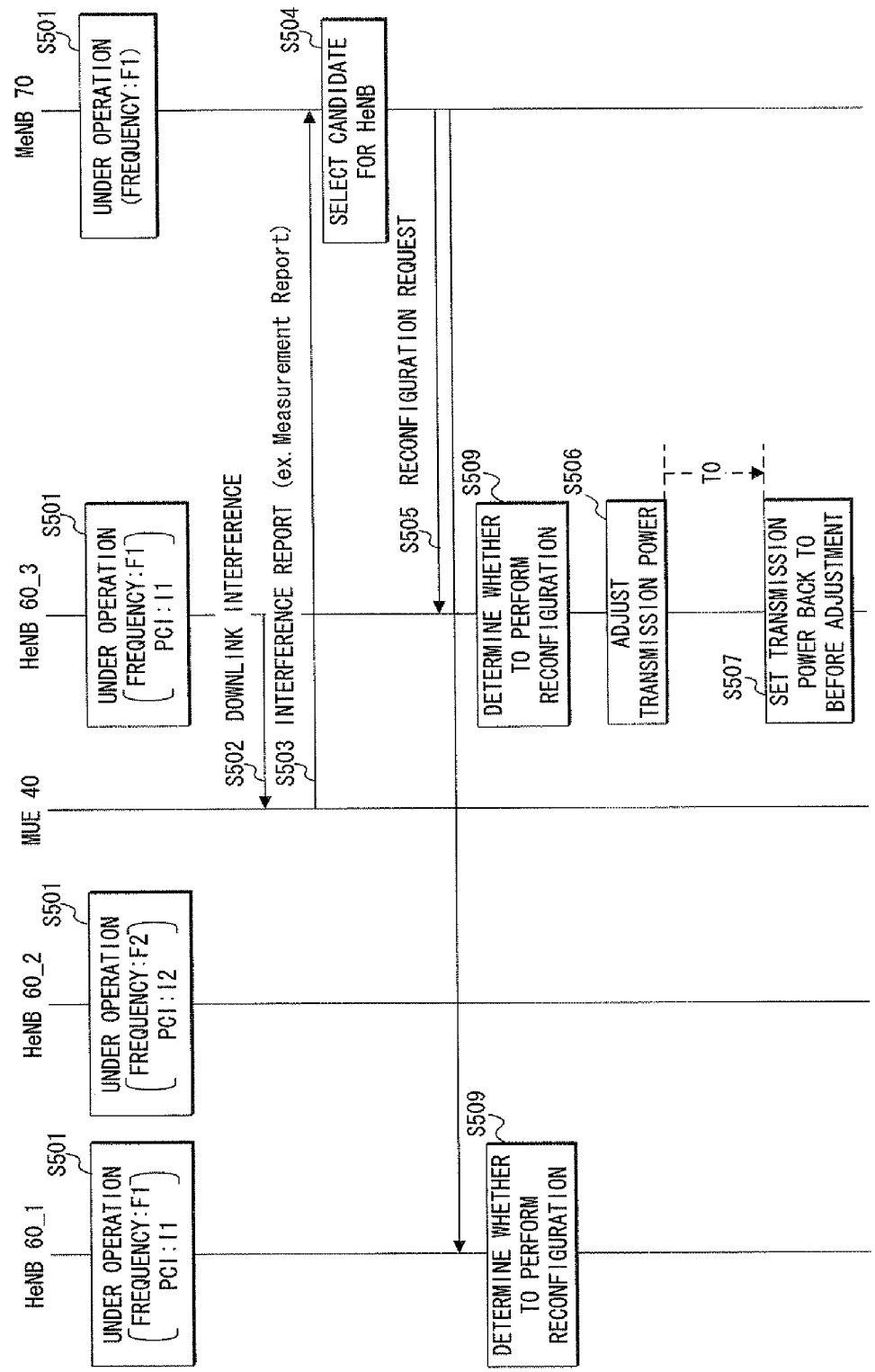
FIG. 15 is a sequence chart showing an example of an overall operation of the mobile communication system according to the sixth exemplary embodiment of the present invention.

A mobile communication system according to this exemplary embodiment has the same structure as the mobile communication system 1a described earlier in the fourth exemplary embodiment. In the operation, as shown in FIG. 15, the MeNB 70 and the HeNB 60 respectively execute the same processing as the RNC 50 and the HNB 10 shown in FIG. 11, and the mobile communication system 1a thereby operates in the same manner as in the third exemplary embodiment described earlier.

In this manner, according to this exemplary embodiment, the home cell serving as the source of interference to the MUE can be selected accurately just like the fifth exemplary embodiment described above. In addition, the HeNB other than candidates for the destination of a reconfiguration request does not need to determine whether or not to perform reconfiguration on the home cell. It is thereby possible to reduce the processing load on the HeNB compared to the fifth exemplary embodiment described above and further to suppress the reduction of the communication capacity in the home cell.

It should be noted that the present invention is not limited to the above-described exemplary embodiments, and it will be understood by those of ordinary skill in the art that various changes in form and details may be made therein without departing from the spirit and scope of the present invention as defined by the claims. For example, each processing of HNB, RNC, HeNB and MeNB described in the above-described exemplary embodiments may be provided as a program to be executed by a computer. In this case, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

This application is based upon and claims the benefit of priority from Japanese patent application No. 2009-229473, filed on Oct. 1, 2009, the disclosure of which is incorporated herein in its entirety by reference.

INDUSTRIAL APPLICABILITY

The present invention is applied to a mobile communication system, a base station, a network device, and control method and program thereof and, is particularly applied to the purpose of reducing downlink interference to a user equipment.

REFERENCE SIGNS LIST 1, 1a MOBILE COMMUNICATION SYSTEM
2 HNB-GW
3 CORE NETWORK
4 HeNB-GW
10, 10_1-10_3 HNB
11, 11_1-11_3, 61, 61_1-61_3 HOME CELL
20, 20_1-20_3 HUE
30 MNB
31, 71 MACRO CELL
40 MUE
50 RNC
60, 60_1-60_3 HeNB
70 MeNB
101, 401 RADIO COMMUNICATION UNIT
102, 501, 502 COMMUNICATION UNIT
103, 403, 503 TRANSMISSION PROCESSING UNIT
104, 402, 504 RECEPTION PROCESSING UNIT
105, 505 RECONFIGURATION CONTROL UNIT
405 DOWNLINK INTERFERENCE REPORTING UNIT
F1, F2 FREQUENCY
C1, C2 PSC
I1, I2 PCI
T0 SPECIFIED TIME
Th1, Th2 THRESHOLD

The invention claimed is:
1. The mobile communication system comprising:
a macro base station (MNB) receiving interference radio resource information notified as a cause of occurrence of downlink interference from a macro user equipment (MUE), wherein the downlink interference affects downlink communication from the macro base station (MNB) to the macro user equipment (MUE);

one or a plurality of Home Node B base stations (HNB); and a centralized radio network controller device (RNC) transmitting a request for updating configuration to at least one of the one or a plurality of Home Node B base stations (HNB) based on the interference radio resource information;

the at least one of the one or a plurality of Home Node B base stations (HNB) determining whether or not to update its configuration based on uplink interference to the at least one of the one or a plurality of Home Node B base stations (HNB) wherein the uplink interference affects uplink communication from a home user equipment (HUE) to the at least one of the one or a plurality of Home Node B base stations (HNB), upon receiving the request for update.

2. The mobile communication system according to claim 1, wherein the at least one of the one or a plurality of Home Node B base stations (HNB) that has received the request for update determines to update its configuration when a level of the uplink interference is equal to or higher than a threshold.

3. A centralized radio network controller device (RNC) comprising:

a selecting unit selecting, upon receiving interference radio resource information notified as a cause of occurrence of downlink interference from a macro user equipment (MUE), wherein the downlink interference affects downlink communication from a macro base station (MNB) to the macro user equipment (MUE), at least one of one or a plurality of Home Node B base stations (HNB) to update configuration, based on the interference radio resource information about radio resources used by the macro base station (MNB), and based on other information about radio resources used by each of the one or a plurality of Home Node B base stations (HNB); and a transmitting unit transmitting a request for updating the configuration to the selected base station of the one or plurality of Home Node B base stations (HNB).

4. The network device according to claim 3, wherein the selecting unit is configured to select at least one of the one or a plurality of Home Node B base stations (HNB) using at least one of a frequency and a cell identifier notified as a cause of occurrence of downlink interference from a user equipment as the at least one of the one or a plurality of Home Node B base stations (HNB) to update its configuration.

5. A method of controlling a centralized radio network controller device (RNC) that can communicate with a macro base station (MNB) and one or a plurality of Home Node B base stations (HNB), comprising:

selecting, upon receiving interference radio resource information notified as a cause of occurrence of downlink interference from a macro user equipment (MUE), wherein the downlink interference affects downlink communication from a macro base station (MNB) to the macro user equipment (MUE), at least one of one or a plurality of Home Node B base stations (HNB) to update configuration, based on the interference radio resource information about radio resources used by the macro base station (MNB), and based on other information about radio resources used by each of the one or a plurality of Home Node B base stations (HNB); and transmitting a request for updating the configuration to the selected base station of the one or plurality of Home Node B (HNB) base stations.

6. A method of controlling a Home Node B base station (HNB) that can communicate with a centralized radio network controller device (RNC), comprising:

receiving, by the centralized radio network controller device (RNC), interference radio resource information notified as a cause of occurrence of downlink interference from a macro user equipment (MUE), wherein the downlink interference affects downlink communication from a macro base station (MNB) to the macro user equipment (MUE);

transmitting, by the centralized radio network controller device (RNC), a request for updating configuration to the Home Node B base station (HNB) based on the interference radio resource information;

determining, by the Home Node B base station (HNB), whether or not to update the configuration of the Home Node B base station (HNB) based on radio resources used by the Home Node B base station (HNB), upon receiving the request for update.

7. A method of controlling a Home Node B base station (HNB) that can communicate with a centralized radio network controller device (RNC), comprising:

receiving, by the centralized radio network controller device (RNC), interference radio resource information notified as a cause of occurrence of downlink interference from a macro user equipment (MUE), wherein the downlink interference affects downlink communication from a macro base station (MNB) to the macro user equipment (MUE);

transmitting, by the centralized radio network controller device (RNC), a request for updating configuration to the Home Node B base station (HNB) based on the interference radio resource information;

determining, by the Home Node B base station (HNB), whether or not to update the configuration of the Home Node B base station (HNB) based on uplink interference to the Home Node B base station (HNB) wherein the uplink interference affects uplink communication from a home user equipment (HUE) to the home Node B base station (HNB), upon receiving the request for update.

8. A non-transitory computer readable medium storing a control program, the program causing a centralized radio network controller device (RNC) that can communicate with a macro base station (MNB) and one or a plurality of Home Node B base stations (HNB) to execute:

a process to select, upon receiving interference radio resource information notified as a cause of occurrence of downlink interference from a macro user equipment (MUE), wherein the downlink interference affects downlink communication from a macro base station (MNB) to the macro user equipment (MUE), at least one of one or a plurality of Home Node B base stations (HNB) to update configuration, based on the interference radio resource information about radio resources used by the macro base station (MNB), and based on other information about radio resources used by each of the one or a plurality of Home Node B base stations (HNB); and a process to transmit a request for updating the configuration to the selected base station of the one or plurality of Home Node B (HNB) base stations based on the interference radio resource information.

9. A non-transitory computer readable medium storing a control program, the program causing a Home Node B base station (HNB) that can communicate with a centralized radio network controller device (RNC) to execute:

a process,
- to receive a request, from the centralized radio network controller device (RNC), for updating configuration of the Home Node B base station (HNB) based on interference radio resource information notified as a cause of occurrence of downlink interference from a macro user equipment (MUE), wherein the downlink interference affects downlink communication from a macro base station (MNB) to the macro user equipment (MUE); and
- to determine whether or not to update the configuration of the Home Node B base station (HNB) based on radio resources used by the Home Node B base station (HNB), upon receiving the request for update.

10. A non-transitory computer readable medium storing a control program, the program causing a Home Node B base station (HNB) that can communicate with a centralized radio network controller device (RNC) to execute:

a process,
- to receive a request, from the centralized radio network controller device (RNC), for updating configuration of the Home Node B base station (HNB) based on interference radio resource information notified as a cause of occurrence of downlink interference from a macro user equipment (MUE), wherein the downlink interference affects downlink communication from a macro base station (MNB) to the macro user equipment (MUE); and
- to determine whether or not to update the configuration of the Home Node B base station (HNB) based on uplink interference to the Home Node B base station (HNB) wherein the uplink interference affects uplink communication from a home user equipment (HUE) to the home Node B base station (HNB), upon receiving the request for update.

* * * * *